US009146451B2

(12) United States Patent
Suzuki et al.

(10) Patent No.: US 9,146,451 B2
(45) Date of Patent: Sep. 29, 2015

(54) LIGHT SOURCE DEVICE, METHOD OF DRIVING DISCHARGE LAMP, AND PROJECTOR

(75) Inventors: Junichi Suzuki, Chino (JP); Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 513 days.

(21) Appl. No.: 13/572,358

(22) Filed: Aug. 10, 2012

(65) Prior Publication Data

US 2013/0050662 A1   Feb. 28, 2013

(30) Foreign Application Priority Data

Aug. 22, 2011 (JP) ................................ 2011-180327
Jun. 22, 2012 (JP) ................................ 2012-140544

(51) Int. Cl.
*G03B 21/20* (2006.01)
*H05B 41/288* (2006.01)
*H05B 41/292* (2006.01)

(52) U.S. Cl.
CPC ........ *G03B 21/2026* (2013.01); *G03B 21/2053* (2013.01); *H05B 41/2887* (2013.01); *H05B 41/2928* (2013.01); *Y02B 20/202* (2013.01)

(58) Field of Classification Search
CPC ........... G03B 21/2026; G03B 21/2053; H05B 41/2888; H05B 41/2887; H05B 41/2886; H05B 41/2885; H05B 41/2883; H05B 41/2882; H05B 41/2881; H05B 41/288; H05B 41/2928; H05B 41/2926; H05B 41/2925; H05B 41/2923; H05B 41/2921; H05B 41/292

USPC ............................................ 353/85; 315/291
See application file for complete search history.

(56) References Cited

U.S. PATENT DOCUMENTS

| | | | | |
|---|---|---|---|---|
| 6,232,725 | B1 * | 5/2001 | Derra et al. | 315/209 R |
| 7,023,144 | B2 * | 4/2006 | Suzuki et al. | 315/246 |
| 7,443,103 | B2 * | 10/2008 | Li et al. | 315/209 R |
| 8,314,570 | B2 * | 11/2012 | Tsukamoto et al. | 315/291 |
| 8,450,937 | B2 * | 5/2013 | Yamamoto et al. | 315/209 R |
| 8,513,893 | B2 * | 8/2013 | Ono et al. | 315/209 R |
| 8,591,034 | B2 * | 11/2013 | Terashima et al. | 353/7 |
| 2006/0012316 | A1 * | 1/2006 | Hirata et al. | 315/291 |
| 2006/0050246 | A1 * | 3/2006 | Moench et al. | 353/85 |
| 2006/0290292 | A1 * | 12/2006 | Li et al. | 315/194 |
| 2007/0164687 | A1 * | 7/2007 | Watanabe et al. | 315/291 |
| 2009/0033808 | A1 * | 2/2009 | Maeda et al. | 348/756 |
| 2009/0200954 | A1 * | 8/2009 | Li et al. | 315/246 |
| 2010/0013400 | A1 * | 1/2010 | Honsberg-Riedl et al. | 315/246 |
| 2010/0084987 | A1 | 4/2010 | Yamauchi et al. | |
| 2010/0128232 | A1 * | 5/2010 | Kagata et al. | 353/85 |

(Continued)

FOREIGN PATENT DOCUMENTS

JP   A-2007-115534   5/2007
JP   A-2010-102202   5/2010

(Continued)

*Primary Examiner* — Bao-Luan Le
(74) *Attorney, Agent, or Firm* — Oliff PLC

(57) ABSTRACT

A light source device includes a discharge lamp, and a discharge lamp driving device that supplies a driving current to a pair of electrodes. The discharge lamp driving device includes an alternating current supply unit that supplies an alternating current with a frequency equal to or higher than 1 kHz and equal to or lower than 10 GHz to the electrodes, and a direct current supply unit that supplies a direct current to the electrodes.

14 Claims, 5 Drawing Sheets

(56) References Cited

U.S. PATENT DOCUMENTS

| | | | |
|---|---|---|---|
| 2010/0141906 A1* | 6/2010 | Deppe et al. | 353/86 |
| 2010/0157257 A1* | 6/2010 | Nishizawa et al. | 353/85 |
| 2011/0043771 A1* | 2/2011 | Hirao | 353/85 |
| 2011/0063584 A1* | 3/2011 | Hirao et al. | 353/85 |
| 2011/0128508 A1* | 6/2011 | Yamada et al. | 353/85 |
| 2012/0026468 A1* | 2/2012 | Terashima et al. | 353/7 |
| 2012/0074858 A1* | 3/2012 | Ono et al. | 315/209 R |

FOREIGN PATENT DOCUMENTS

| | | |
|---|---|---|
| JP | A-2010-114064 | 5/2010 |
| JP | A-2011-003486 | 1/2011 |

\* cited by examiner

LIGHT SOURCE DEVICE, METHOD OF DRIVING DISCHARGE LAMP, AND PROJECTOR

BACKGROUND

1. Technical Field

The present invention relates to a light source device, a method of driving a discharge lamp, and a projector.

2. Related Art

As a light source of a projector, a discharge lamp such as a high pressure mercury lamp and a metal halide lamp is used. As a method of driving such a discharge lamp, for example, there is a method of supplying a high frequency alternating current as a driving current to an antenna in a discharge lamp body (see JP-A-2007-115534). According to the method of driving the discharge lamp, it is possible to obtain stability of discharge, it is possible to prevent blackening or devitrification of the discharge lamp body from occurring, and thus it is possible to suppress decrease of durability of the discharge lamp.

However, for example, when the high frequency alternating current is supplied to an pair of electrodes arranged to be opposed in the discharge lamp body in which a discharge medium is enclosed, to turn on the discharge lamp, using the method of driving the discharge lamp in JP-A-2007-115534, arc discharge occurs between the pair of electrodes, the electrodes are at high temperature, the electrodes are partially melted, a space between the electrodes is broaden.

For example, in the usage for a projector, to improve efficiency in light usage, it is preferable to keep a narrow state between the electrodes, and intensity of light emission is small. It is not preferable that the space between the electrodes is broadened from each other during ignition, since the efficiency of light usage is decreased. The change between the electrodes means change in impedance between the electrodes. For this reason, even when the discharge lamp is efficiently turned on at the initial time of ignition, impedance mismatching occurs as the time elapses. As a result, there is a problem that reactive power is increased, and the efficiency is decreased.

Meanwhile, there is a driving method of supplying an alternating current (a direct alternating current) with a rectangular waveform as a driving current (for example, see JP-A-2010-114064). According to the method of driving the discharge lamp of JP-A-2010-114064), even when the protrusions of the front end portions of a pair of electrodes are temporarily melted by discharge, the protrusions are formed again during the discharge, and thus it is possible to keep the state where the electrodes are narrow.

However, in the driving method disclosed in JP-A-2010-114064, blackening or devitrification of the discharge lamp body occurs, and durability of the discharge lamp may be decreased.

SUMMARY

An advantage of some aspects of the invention is to provide a light source device which suppresses the blackening of a discharge lamp and suppress broadening of the inter-electrode distance to drive the discharge lamp, a method of driving the discharge lamp, and a projector.

According to an aspect of the invention, there is provided A light source device including: a discharge lamp that has a first electrode and a second electrode arranged to be opposed to each other in a hollow portion in which a discharge medium is enclosed; and a driving device that supplies a driving voltage to the first electrode and the second electrode, wherein the driving voltage is applied to the discharge medium through the first electrode and the second electrode such that the discharge medium emits light, wherein in a first period, the driving device periodically changes relative potential of the first electrode with respect to the second electrode, wherein in a second period, the driving device does not periodically change the relative potential of the first electrode with respect to the second electrode, wherein the second period includes a third period of keeping the relative potential of the first electrode with respect to the second electrode to constant potential, and a fourth period of stopping the application of the driving voltage to the first electrode and the second electrode, and wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of b<c is satisfied.

In the light source device according to the aspect of the invention, the driving voltage is applied between the first electrode and the second electrode of the discharge lamp in the first period to allow the alternating current to flow, and thus the blackening of the discharge lamp is suppressed. When the temperatures of the first electrode and the second electrode are raised by the discharge during the first period and both electrodes are partially melted, the inter-electrode distance is broadened. Since the driving voltage is not applied between the first electrode and the second electrode in the second period, the temperatures of the first electrode and the second electrode are lowered as compared with the first period, and the partial melting of both electrodes is suppressed. In the third period included in the second period, the direct current voltage of the constant potential with the absolute value c higher than the potential with the absolute value b in the first period is applied between the first electrode and the second electrode, and thus a part of the electrode melted in at least one electrode is solidified to form a protrusion. Accordingly, the inter-electrode distance broadened in the first period is narrowed in the second period. That is, it is possible to suppress the broadening of the inter-electrode distance and to drive the discharge lamp, while suppressing the blackening of the discharge lamp. Therefore, it is possible to provide the light source device having long light emission durability.

According to another aspect of the invention, there is provided a light source device including: a discharge lamp that has a first electrode and a second electrode arranged to be opposed to each other in a hollow portion in which a discharge medium is enclosed; and a driving device that supplies a driving voltage to the first electrode and the second electrode, wherein the driving voltage is applied to the discharge medium through the first electrode and the second electrode such that the discharge medium emits light, wherein in a first period, the driving device periodically changes relative potential of the first electrode with respect to the second electrode, wherein in a second period, the driving device does not periodically change the relative potential of the first electrode with respect to the second electrode, wherein the second period includes a third period of keeping the relative potential of the first electrode with respect to the second electrode to constant potential, and a fourth period of stopping the applying of the driving voltage to the first electrode and the second electrode, and wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of c<2b is satisfied.

In the light source device according to the aspect of the invention, the driving voltage is applied between the first electrode and the second electrode of the discharge lamp in the first period to allow the alternating current to flow, and thus the blackening of the discharge lamp is suppressed. When the temperatures of the first electrode and the second electrode are raised by the discharge during the first period and both electrodes are partially melted, the inter-electrode distance is broadened. Since the driving voltage is not applied between the first electrode and the second electrode in the second period, the temperatures of the first electrode and the second electrode are lowered as compared with the first period, and the partial melting of both electrodes is suppressed. In the third period included in the second period, the direct current voltage of the constant potential with the absolute value c lower than the potential with twice the absolute value b in the first period is applied between the first electrode and the second electrode, and thus a part of the electrode melted in at least one electrode is solidified to form a protrusion. Accordingly, the inter-electrode distance broadened in the first period is narrowed in the second period. That is, it is possible to suppress the broadening of the inter-electrode distance and to drive the discharge lamp, while suppressing the blackening of the discharge lamp. Therefore, it is possible to provide the light source device having long light emission durability.

According to still another aspect of the invention, there is provided a light source device including: a discharge lamp that has a first electrode and a second electrode arranged to be opposed to each other in a hollow portion in which a discharge medium is enclosed; and a driving device that supplies a driving voltage to the first electrode and the second electrode, wherein the driving voltage is applied to the discharge medium through the first electrode and the second electrode such that the discharge medium emits light, wherein in a first period, the driving device periodically changes relative potential of the first electrode with respect to the second electrode, wherein in a second period, the driving device does not periodically change the relative potential of the first electrode with respect to the second electrode, wherein the second period includes a third period of keeping the relative potential of the first electrode with respect to the second electrode to constant potential, and a fourth period of stopping the applying of the driving voltage to the first electrode and the second electrode, and wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of b<c<2b is satisfied.

In the light source device according to the aspect of the invention, the driving voltage is applied between the first electrode and the second electrode of the discharge lamp in the first period to allow the alternating current to flow, and thus the blackening of the discharge lamp is suppressed. When the temperatures of the first electrode and the second electrode are raised by the discharge during the first period and both electrodes are partially melted, the inter-electrode distance is broadened. Since the driving voltage is not applied between the first electrode and the second electrode in the second period, the temperatures of the first electrode and the second electrode are lowered as compared with the first period, and the partial melting of both electrodes is suppressed. In the third period included in the second period, the direct current voltage of the constant potential with the absolute value c higher than the potential with the absolute value b and lower than twice the potential with the absolute value b in the first period is applied between the first electrode and the second electrode, and thus a part of the electrode melted in at least one electrode is solidified to form a protrusion. Accordingly, the inter-electrode distance broadened in the first period is narrowed in the second period. That is, it is possible to suppress the broadening of the inter-electrode distance and to drive the discharge lamp, while suppressing the blackening of the discharge lamp. Therefore, it is possible to provide the light source device having long light emission durability.

In the light source device, a frequency of the relative potential of the first electrode with respect to the second electrode in the first period may be equal to or higher than 1 kHz and equal to or lower than 10 GHz.

Accordingly, it is possible to more reliably suppress the blackening of the discharge lamp.

In the light source device, polarities in the first electrode with respect to the second electrode in two of the third periods adjacent in time series to each other may be different from each other.

Accordingly, it is possible to form the protrusions at the front end portions of the first electrodes and the second electrodes, that is, a pair of electrodes.

In the light source device, the driving device may repeat the first period and the second period, and the third period may be provided just after the first period.

Accordingly, it is possible to more reliably suppress the blackening of the discharge lamp, and it is possible to suppress the broadening of the inter-electrode distance.

In the light source device, the driving device may repeat the first period and the second period, and the first period may be provided just after the fourth period.

Accordingly, it is possible to more reliably suppress the blackening of the discharge lamp, and it is possible to suppress the broadening of the inter-electrode distance.

In the light source device, a length of the first period may be equal to or longer than 0.5 ms and equal to or shorter than 50 ms.

Accordingly, it is possible to more reliably suppress the blackening of the discharge lamp, and it is possible to suppress the broadening of the inter-electrode distance.

In the light source device, a length of the third period may be equal to or more than 1% and equal to or less than 50% of the length of the first period.

Accordingly, it is possible to more reliably suppress the blackening of the discharge lamp, and it is possible to suppress the broadening of the inter-electrode distance.

In the light source device, a length of the fourth period may be equal to or longer than 1 μs and equal to or shorter than 5 ms.

Accordingly, it is possible to more reliably suppress the blackening of the discharge lamp, and it is possible to suppress the broadening of the inter-electrode distance.

In the light source device, in two of the first periods adjacent in time series to each other, a length of a start of a first of the first periods to an end of the second period just after a second of the first periods may be equal to or longer than 1 ms and equal to or shorter than 100 ms.

Accordingly, it is possible to more reliably suppress the blackening of the discharge lamp, and it is possible to suppress the broadening of the inter-electrode distance.

In the light source device, a waveform of the driving voltage in the first period may be rectangular.

Accordingly, it is possible to more reliably suppress the blackening of the discharge lamp.

According to still another aspect of the invention, there is provided a method of driving a discharge lamp which has a first electrode and a second electrode arranged to be opposed to each other in a hollow portion in which a discharge medium is enclosed, wherein a driving voltage is applied to the discharge medium through the first electrode and the second electrode such that the discharge medium emits light and wherein when a first period of periodically changing the relative potential of the first electrode with respect to the second electrode, and a second period including a third period of not periodically changing the relative potential of the first electrode with respect to the second electrode and keeping the relative potential of the first electrode with respect to the second electrode to constant potential, and a fourth period of stopping applying the driving voltage to the first electrode and the second electrode are provided, when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of $b<c<2b$ is satisfied.

Accordingly, the blackening of the discharge lamp is suppressed, the broadening of the inter-electrode distance is suppressed, and it is possible to drive the discharge lamp. The input of reactive power by the change of the inter-electrode distance is suppressed, and it is possible to reduce power consumption.

According to still another aspect of the invention, there is provided a projector including: a light source device; a modulation device that modulates light output from the light source device on the basis of image information; and a projection device that projects the light modulated by the modulation device, wherein the light source device includes a discharge lamp that has a first electrode and a second electrode arranged to be opposed to each other in a hollow portion in which a discharge medium is enclosed, and a driving device that supplies a driving voltage to the first electrode and the second electrode, wherein the driving voltage is applied to the discharge medium through the first electrode and the second electrode such that the discharge medium emits light, wherein in a first period, the driving device periodically changes relative potential of the first electrode with respect to the second electrode, wherein in a second period, the driving device does not periodically change the relative potential of the first electrode with respect to the second electrode, wherein the second period includes a third period of keeping the relative potential of the first electrode with respect to the second electrode to constant potential, and a fourth period of stopping the applying of the driving voltage to the first electrode and the second electrode, wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of $b<c<2b$ is satisfied.

Accordingly, the blackening of the discharge lamp is suppressed, the broadening of the inter-electrode distance is suppressed, and it is possible to drive the discharge lamp. Therefore, it is possible to reduce power consumption, and it is possible to provide the projector capable of displaying a stable and satisfactory image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a light source device, a method of driving a discharge lamp, and a projector will be described in detail on the basis of preferred embodiments shown in the accompanying drawings.

Light Source Device

Figure 1:
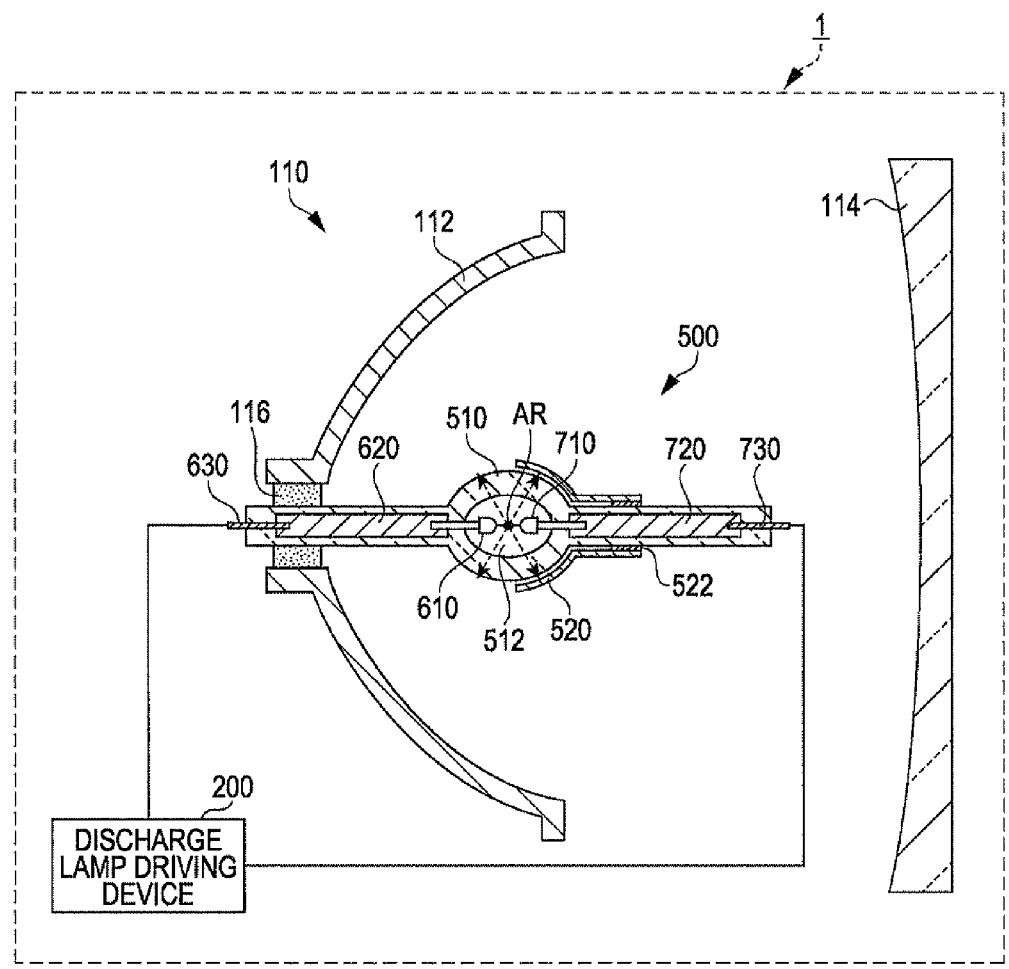
FIG. 1 is a cross-sectional view (also including a block diagram) illustrating a light source device according to an embodiment of the invention.
Figure 2:
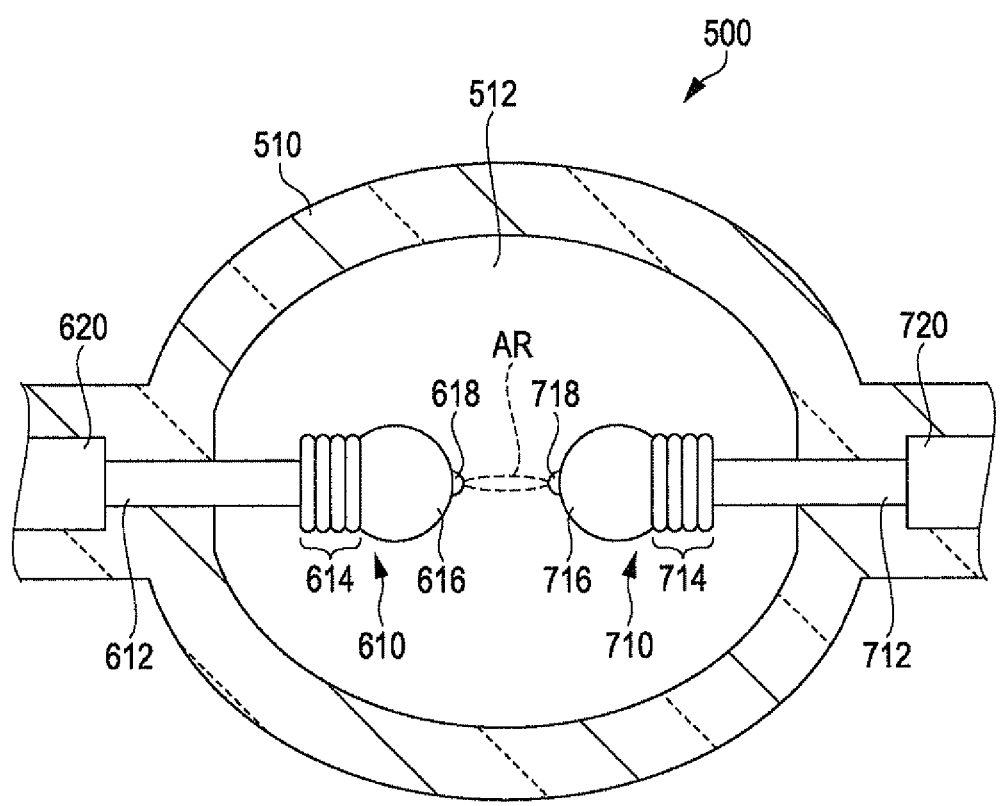
FIG. 2 is a cross-sectional view illustrating a discharge lamp of the light source device shown in FIG. 1.
Figure 3:
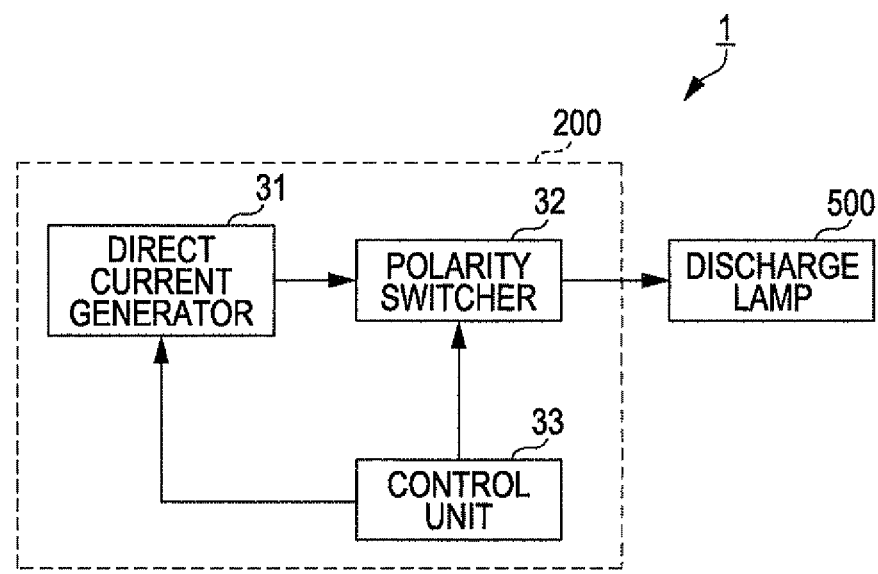
FIG. 3 is a block diagram illustrating the light source device shown in FIG. 1.
Figure 4:
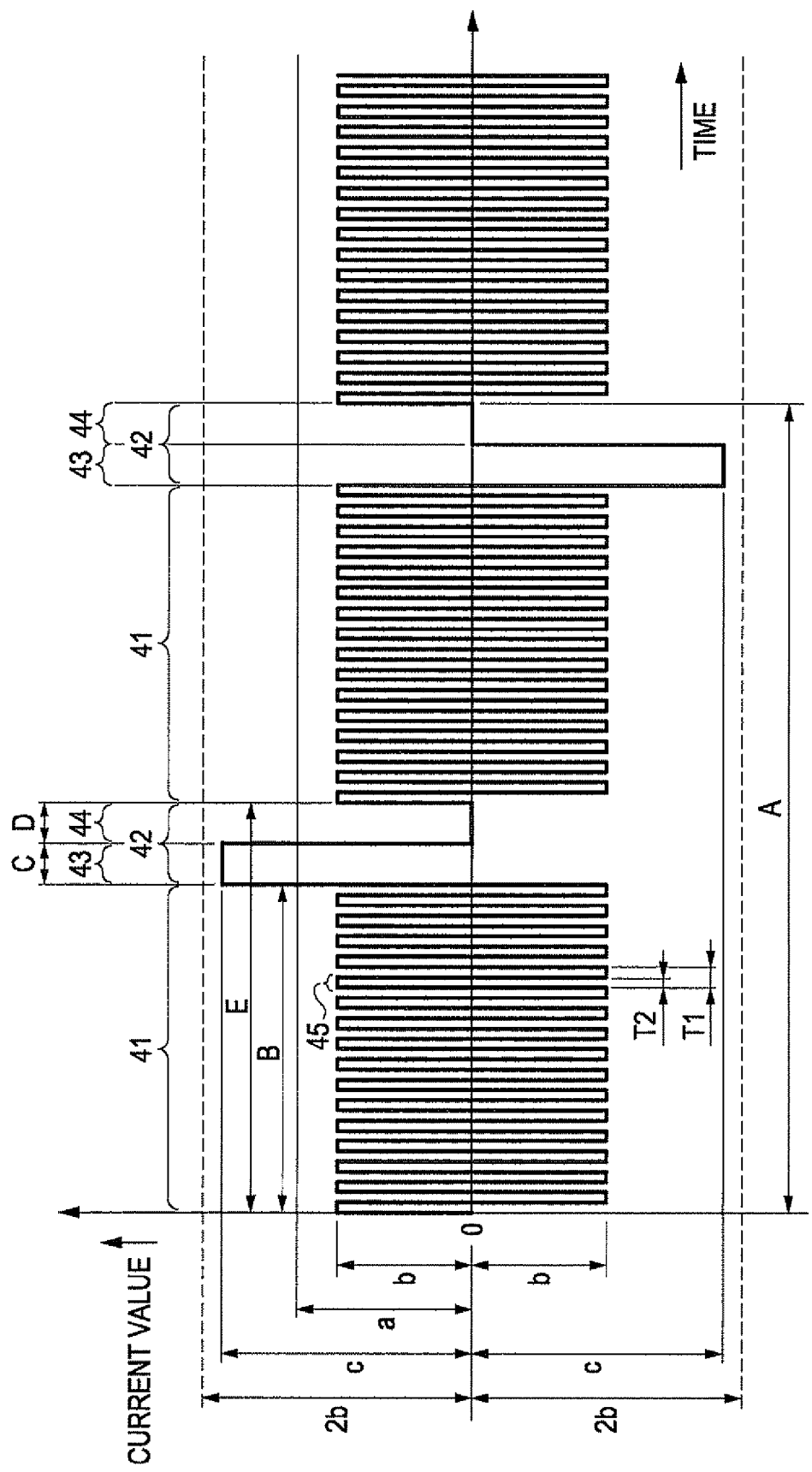
FIG. 4 is a diagram illustrating a driving current of the light source device shown in FIG. 1.

FIG. 1 is a cross-sectional view (also including a block diagram) illustrating a light source device according to an embodiment of the invention, FIG. 2 is a cross-sectional view illustrating a discharge lamp of the light source device shown in FIG. 1, FIG. 3 is a block diagram illustrating the light source device shown in FIG. 1, and FIG. 4 is a diagram illustrating a driving current of the light source device shown in FIG. 1. In FIG. 2, a sub-reflector is not shown.

As shown in FIG. 1, the light source device 1 of the embodiment includes a light source unit 110 having a discharge lamp 500, and a discharge lamp driving device (a driving device) 200 that drives the discharge lamp 500. Power is supplied from the discharge lamp driving device 200 to the discharge lamp 500, and the discharge lamp 500 is discharged and emits light.

The light source unit 110 includes the discharge lamp 500, a main reflector 112 that has a concave reflective face, and a collimation lens 114 that collimates the output light to output light. The main reflector 112 and the discharge lamp 500 are adhered by an inorganic adhesive 116. In the main reflector 112, a face (an inner face) facing the discharge lamp 500 side is a reflection face, and the reflection face has a rotation elliptical face in the shown configuration.

The shape of the reflection face of the main reflector 112 is not limited to the shape described above, and for example, may be a rotation parabolic face. When the reflection face of the main reflector 112 is the rotation parabolic face and when the light emitting unit of the discharge lamp 500 is disposed at a so-called focus of the rotation parabolic face, the collimation lens 114 may be omitted.

The discharge lamp 500 is provided with a discharge lamp body 510 and a sub-reflector 520 that has a concave reflection face. The discharge lamp body 510 and the sub-reflector 520 are adhered by an inorganic adhesive 522 such that the sub-reflector 520 and the main reflector 112 are opposed to each other and the concave reflection face is disposed with a predetermined gap from the discharge lamp body 510. In the sub-reflector 520, a face (an inner face) facing the discharge lamp 500 is a reflection face, and the reflection face is a spherical face in the shown configuration.

The discharge lamp body 510, in which a discharge medium to be described later is enclosed at the center thereof, has an air-tightly sealed discharge space (a hollow portion) 512, and a light emission container, including the discharge space, (the hollow portion) 512 is formed. A portion corresponding to at least the discharge space 512 of the discharge lamp body 510 has optical transparency. A material constituting the discharge lamp body 510 may be, for example, glass such as quartz glass, and optical transparent ceramics.

The discharge lamp body 510 is provided with a pair of electrodes 610 and 710, one pair of conductive connection members 620 and 720, and one pair of electrode terminals 630 and 730. The electrode (the first electrode) 610 and the electrode terminal 630 are electrically connected by the connection member 620. Similarly, the electrode (the second electrode) 710 and the electrode terminal 730 are electrically connected by the connection member 720.

Each of the electrodes 610 and 710 is housed in the discharge space 512. That is, the electrodes 610 and 710 are disposed such that the front end portions thereof are separated from each other at a predetermined distance and opposed to each other in the discharge space 512 of the discharge lamp body 510.

Considering the use as a light source of a projector to be described later, an inter-electrode distance that is the shortest distance between the electrode 610 and the electrode 710 preferably obtains light emissions close to a point light source, preferably equal to or more than 1 µm and equal to or less than 5 mm, and more preferably equal to or more than 0.5 mm and equal to or less than 1.5 mm.

As shown in FIG. 2, the electrode 610 includes a core rod 612, a coil portion 614, and a body portion 616. In the step before enclosing into the discharge lamp body 510, the electrode 610 is formed by winding an electrode material (tungsten or the like) on the core rod 612 to form the coil portion 614 and heating and melting the formed coil portion 614. Accordingly, on the front end side of the electrode 610, the body portion 616 with high thermal capacity is formed. Similarly to the electrode 610, the electrode 710 includes a core rod 712, a coil portion 714, and a body portion 716, and is formed in the same manner as the electrode 610.

In a state where the discharge lamp 500 is not turned on even once, the body portions 616 and 716 are not provided with protrusions 618 and 718. However, when the discharge lamp 500 is turned on once in a condition to be described later, the protrusions 618 and 718 are formed at the front end portions of the body portions 616 and 716, respectively. The protrusions 618 and 718 are kept during the turning-on of the discharge lamp 500, and are also kept even after turning-off.

The constituent material of the electrodes 610 and 710 may be, for example, a high melting point metal material such as tungsten.

In the discharge space 512, the discharge medium is enclosed. The discharge medium includes, for example, discharge starting gas, or gas contributing to emit light. The discharge medium may include the other gas.

The discharge starting gas may be, for example, a noble gas such as neon, argon, or xenon. The gas contributing to emit light may be, for example, mercury and the vaporization material of a metal halide. The other gas may be, for example, gas having a function of preventing blackening. The gas having the function of preventing the blackening may be, for example, a halogen (for example, bromine), a halogen compound (for example, hydrogen bromide), or a vaporization material thereof.

Considering that the discharge is rapidly started and it is possible to obtain a stable discharge state, atmospheric pressure in the discharge lamp body 510 at the time of turning on the discharge lamp is preferably equal to or higher than 0.1 atm and equal to or lower than 300 atm, and more preferably equal to or higher than 50 atm and equal to or lower than 300 atm.

Each of the electrode terminals 630 and 730 of the discharge lamp 500 is connected to the output terminal of the driving device 200. The discharge lamp driving device 200 supplies a driving current (a driving power) including an alternating current (an alternating power) of a plurality of frequencies to the discharge lamp 500. Specifically, the discharge lamp driving device 200 applies a predetermined driving voltage to the electrodes 610 and 710 through the electrode terminals 630 and 730. The predetermined driving voltage is applied such that the polarities of the electrode 610 and the electrode 710 are alternately changed to anode and cathode. Accordingly, the driving current flows between the electrodes 610 and 710 and the power is supplied to the discharge lamp 500. When the driving current is supplied (the driving voltage is applied) to the electrodes 610 and 710, arc discharge (arc AR) occurs between the front end portions of a pair of electrodes 610 and 710 in the discharge space 512, and the discharge medium emits light. The light (the discharge light) generated by the arc discharge is emitted in all directions from the occurrence position (the discharge position) of the arc AR. The sub-reflector 520 reflects the light emitted in the direction of one electrode 710 toward the main reflector 112. As described above, the light emitted in the direction of the electrode 710 is reflected by the main reflector 112, and thus it is possible to effectively use the light emitted in the direction of the electrode 710. In the embodiment, the discharge lamp 500 is provided with the sub-reflector 520, but the discharge lamp 500 does not have to be provided with the sub-reflector 520.

Next, the discharge lamp driving device 200 will be described with reference to FIG. 3.

As shown in FIG. 3, the discharge lamp driving device 200 includes a direct current generator 31 that generates a direct current, a polarity switcher 32 that switches the positive and negative polarities of the direct current output from the direct current generator 31, and a control unit 33. The polarity of the direct current is switched by the polarity switcher 32 to generate an alternating current (a direct alternating current) of a predetermined frequency. The polarity of the alternating current is switched by the polarity switcher 32 to generate a direct current with different polarity. The discharge lamp drive device 200 supplies the generated alternating current and the direct current as the driving current to a pair of electrodes 610 and 710 of the discharge lamp 500. The alternating current supply unit and the direct current supply unit are configured by the alternating current generator 31 and the polarity switcher 32.

The control unit 33 controls the whole operation of the direct current generator 31, the polarity switcher 32, and the discharge lamp driving device 200. The direct current generator 31 adjusts the output current value, and the ON/OFF switching of the direct current generator 31 and the adjustment of the current value of the direct current generator 31 are controlled by the control of the control unit 33. The timing of the switching of the polarity of the direct current in the polarity switcher 32 is adjusted by the control of the control unit 33.

In the embodiment, the discharge lamp driving device 200 generates the direct current by the direct current generator 31, but the direction current generator 31 may be replaced by a direct current voltage generator, and the polarity switcher 32 may switch positive and negative polarities with respect to the reference potential of the direction voltage. Accordingly, the control unit 33 switches the polarity of the direct current voltage by the polarity switcher 32 to generate an alternating current voltage of a predetermined frequency. The polarity of the direct current voltage is switched by the polarity switcher 32 to generate the direct current voltage with different polarity. The discharge lamp driving device 100 applies the alternating current voltage and the direction voltage with the different polarity as the driving voltage to a pair of electrodes 610 and 710 of the discharge lamp 500. Accordingly, the alternating current and the direct current flow and the power is supplied between a pair of electrodes 610 and 710. In other words, the alternating current voltage represents that the relative potential of the electrode 610 with respect to the electrode 710 is periodically switched to be positive and negative with respect to the reference potential. In the embodiment, the reference potential is, for example, 0 V. When the electrode potential is positive with respect to the reference potential, the electrode serves as an anode, and when the electrode potential is negative with respect to the reference potential, the electrode serves as a cathode.

As shown in FIG. 4, in the discharge lamp driving device 200, when the discharge lamp 500 is turned on, the ON/OFF switching of the direct current generator 31, the adjustment of the current value of the direct current generated by the direct current generator 31, and the switching of the polarity of the direct current in the polarity switcher 32 are performed by the control of the control unit 33. Accordingly, the alternating current supply section 41 of generating the alternating current (the high frequency alternating current) and supplying the alternating current to a pair of electrodes 610 and 710 and the alternating current stop section 42 of stopping the supply of the alternating current are alternatively repeated, and the direct current supply section 43 of generating the direction current and supplying the direct current to a pair of electrodes 610 and 710 during the alternating current stop section 42, and direct current stop section 44 of stopping the supplying of the direct current are provided in this order.

In this case, during the one alternating current stop section 42, one direct current supply section 43 and one direct current stop section 44 are provided. The direct current supply section 43 is provided just after the alternating current supply section 41, and the alternating current supply section 41 is provided just after the direct current stop section 44.

The polarities of the direct currents in two direct current supply sections 43 adjacent in time series to each other are set to be different from each other. Accordingly, it is possible to form the protrusions 618 and 718 at the front sections of a pair of electrodes 610 and 710.

As described above, in the discharge lamp driving device 200, the driving current for driving the discharge lamp shown in FIG. 4 is generated and output. The driving current output from the discharge lamp driving device 200 is supplied to a pair of electrodes 610 and 710 of the discharge lamp 500.

Accordingly, as described above, the arc discharge occurs between the front portions of a pair of electrodes 610 and 710, and the discharge lamp 500 is turned on.

As described above, the alternating current (the high frequency alternating current) may be transferred to the alternating current voltage (the high frequency alternating current voltage). Similarly, the direct current may be transferred to the direct current voltage. Accordingly, the alternating current supply section 41 may be transferred to the first period of applying the high frequency alternating current voltage to the electrodes 610 and 710, and the alternating current stop section 42 may be transferred to the second period of not applying the high frequency alternating current voltage to the electrodes 610 and 710. The direct current supply section 43 may be transferred to the third period of applying the direct current voltage with the constant potential to the electrodes 610 and 720. The direct current stop section 44 may be transferred to the fourth period of stopping the applying of the direct current to the electrodes 610 720. That is, the control unit 33 in the discharge lamp driving device 200 alternately repeats the first period and the second period, and controls the direct current generator 31 and the polarity switcher 32 to provide the third period of generating the direct current voltage and applying the direct current voltage to a pair of electrodes 610 and 710, and the fourth period of stopping the applying of the direction current voltage in this order in the second period.

In the light source device 1, the discharge lamp 500 is turned on using the driving current (the driving voltage) of the condition to be described later. Accordingly, when the discharge lamp 500 is turned on, the temperatures of the electrodes 610 and 710 are changed, the protrusions 618 and 718 are formed at the front end portions of the electrodes 610 and 710 by the temperature change, respectively, it is possible to keep the protrusions 618 and 718, it is possible to suppress the blackening of the discharge lamp 500, and it is possible to achieve long durability.

That is, first, in the alternating current supply section (the first period) 41, the temperatures of the electrodes 610 and 710 are raised, a part of the front end portions of the electrodes 610 and 710 is melted, the melted electrode material gathers at the front end portions of the electrodes 610 and 710 by surface tension. Meanwhile, in the alternating current stop section 42 (the second period), the supplying of the driving current is stopped, the temperatures of the electrodes 610 and 710 are lowered as compared with the alternating current supply section (the first period) 41, and the melted electrode material is solidified. The state where the melted electrode material gathers at the front end portions of the electrodes 610 and 710 and the state where the melted electrode material is solidified are repeated, and thus the growth of the protrusions 618 and 718 occurs. However, by providing the direct current supply section (the third period) 43 in the alternating current stop section (the second period) 42 as described above, the growth (the formation) of the protrusions 618 and 718 are promoted as compared with the case where the direct current supply section is not provided. Accordingly, the protrusions 618 and 718 are reliably formed, and thus it is possible to suppress the broadening of the inter-electrode distance. In the light source device 1 in this state, it is possible to drive efficiently the discharge lamp 500. In the direct current supply section (the third period) 43, the front end portions of the electrodes 610 and 710 are partially melted, and in the direct current stop section (the fourth period) 44, the melted electrode material is solidified.

In the alternating current supply section (the first period) 41, the blackening of the discharge 500 is suppressed, it is possible to restore the blackening of the discharge lamp 500, and it is possible to achieve the long durability.

The rated power of the discharge lamp 500 is appropriately set according to the usage or the like, and is not particularly limited, but is preferably equal to or higher than 10 W and equal to or lower than 5 kW, and more preferably equal to or higher than 100 W and equal to or lower than 500 W.

The frequency of the alternating current (the alternating current voltage) is preferably equal to or higher than 1 kHz and equal to or lower than 10 GHz, more preferably higher than 1 kHz and equal to or lower than 100 kHz or equal to or higher than 3 MHz and equal to or lower than 10 GHz, even more preferably equal to or higher than 3 kHz and equal to or lower than 100 kHz or equal to or higher than 3 MHz and equal to or lower than 3 GHz, and particularly preferably equal to or higher than 10 kHz and equal to or lower than 100 kHz or equal to or higher than 3 MHz and equal to or lower than 3 GHz. In addition, the frequency of the alternating current (the alternating current voltage) is preferably equal to or higher than 3 kHz and equal to or lower than 100 kHz, and more preferably equal to or higher than 10 kHz and equal to or lower than 100 kHz.

When the electrodes 610 and 710 operate as anodes, the electrode temperature is high compared with the case of operating as cathodes. However, by setting the frequency of the alternating current (the alternating current voltage) to be equal to or higher than the lower limit value, it is possible to prevent the electrode temperature from being changed in one cycle of the alternating current (the alternating current voltage), the blackening of the discharge lamp 500 is restored, and it is possible to recover the blackening of the discharge lamp 500.

However, when the frequency of the alternating current (the alternating current voltage) is lower than the lower limit value, the temperatures of the electrodes 610 and 710 are changed for each cycle of the alternating current, it is difficult to form or keep the protrusions 618 and 718, and the blackening may occur. When the frequency is higher than the upper limit value, a cost is raised.

When the frequency of the alternating current (the alternating current voltage) is higher than 100 kHz and lower than 3 MHz, the discharge is unstable due to an acoustic resonance effect according to the other condition.

In the alternating current supply section (the first section) 41, the frequency of the alternating current (the alternating current voltage) is constant. The invention is not limited thereto, and in the alternating current supply section (the first period) 41, the frequency of the alternating current (the alternating current voltage) may be modified. That is, the frequency of the alternating current (the alternating current voltage) may be changed with the passage of time. Accordingly, it is possible to more precisely perform a control.

When the average value of the amplitude of the alternating current (the alternating current voltage) in the alternating current supply section (the first period) 41 is b and the average value of the absolute value of the direct current (the direct current voltage) in the direct current supply section (the third period) 43 is c, the b and c are set to satisfy the relationship of b<c<2b.

When c is equal to or smaller than b, the protrusions 618 and 718 are not sufficiently formed. When the c is equal to or larger than 2b, the protrusions 618 and 718 are not sufficiently formed. In other words, when the relationship of b<c or c<2b is satisfied, it is possible to reliably form the protrusions 618 and 718.

In the embodiment, the amplitude of the alternating current (the alternating current voltage) is represented by an absolute value of the width of current (potential) in which the polarity is swung to be positive, or an absolute value of the width of current (potential) in which the polarity is swung to be negative. That is, the amplitude of the alternating current voltage may be represented by the absolute value of the difference between the intermediate value between the maximum value and the minimum value of the potential of one electrode (for example, the electrode 610) of a pair of electrodes 610 and 710, and the maximum value. Similarly, the amplitude of the direct current voltage may be represented by the absolute value of the difference between the maximum value of the potential of one electrode (for example, the electrode 610) of a pair of electrodes 510 and 710, and the intermediate value of the alternating current voltage.

When the total period of the alternating current supply section (the first period) 41 and the alternating current stop section (the second period) 42 is E and the period of the alternating current supper section (the first period) 41 is B, a ratio B/E of the period E and the period B is not particularly limited, and appropriately set according to the condition, but preferably equal to or more than 50% and equal to or less than 99%. In the numerical range, particularly, the period (the length) B of the alternating current supply section (the first period) 41 is more preferably longer than the period (the length: E-B) of the alternating current stop section (the second period) 42, and the ratio B/E is more preferably more than 50% and equal to or less than 75%.

When the ratio B/E is less than the lower limit value, the blackening easily occurs by the change of the electrode temperature, according to the other condition. When the ratio B/E is more than the upper limit value, the protrusions 618 and 718 are not formed according to the other condition.

The period B of the alternating current supply section (the first period) 41 is not particularly limited, and is appropriately set according to the condition, but preferably equal to or more than 0.5 ms and equal to or less than 50 ms, and more preferably equal to or more than 1 ms and equal to or less than 10 ms.

When the period B is less than the lower limit value, the blackening occurs according to the other condition. When the period B is more than the upper limit value, the protrusions 618 and 718 are not formed according to the other condition.

The period (length) C of the alternating current supply section (the third period) 43 is not particularly limited, and is appropriately set according to the condition, but preferably equal to or more than 1% and equal to or less than 50% of the length of the period B, and more preferably equal to or more than 5% and equal to or less than 20%. Specifically, the period (the length) C is preferably equal to or more than 5 μs and equal to or less than 25 ms, and more preferably equal to or more than 25 μs and equal to or less than 10 ms.

When the period (the length) C is less than the lower limit value, the protrusions 618 and 718 are not formed according to the other condition. When the period (the length) C is more than the upper limit value, the protrusions 618 and 718 are not formed according to the other condition.

The period (the length) D of the direct current stop section (the fourth period) 44 is not particularly limited, and is appropriately set according to the condition, but preferably equal to or more than 1 μs and equal to or less than 5 ms, and more preferably equal to or more than 5 μs and equal to or less than 2 ms.

When the period (the length) D is less than the lower limit value, the protrusions 618 and 718 are not formed according to the other condition. When the period (the length) D is more than the upper limit value, the protrusions 618 and 718 are not formed according to the other condition, and the blackening occurs.

In two alternating current supply sections (the first periods) 41 adjacent to each other, a period (length) A from a start of the first alternating current supply section (the first period) 41 to an end of the alternating current stop section (the second period) 42 just after the second alternating current supply section (the first period) 41 is preferably equal to or more than 1 ms and equal to or less than 100 ms, and more preferably equal to or more than 2 ms and equal to or less than 10 ms.

When the period (the length) A is less than the lower limit value, the protrusions 618 and 718 are not formed according to the other condition. When the period (the length) A is more than the upper limit value, the protrusions 618 and 718 are not formed according to the other condition.

The period (the length) A is a cycle of the driving current (the alternating current voltage) when the section from the start of the first alternating current supply section (the first period) 41 to the end of the alternating current stop section 42 just after the second alternating current supply section (the first period) 41 in two alternating current supply section (the first period) 41 adjacent to each other is one unit.

A waveform of the alternating current (the alternating current voltage) is rectangular (a rectangular wave). Accordingly, it is possible to suppress the blackening of the discharge lamp 500 more reliably.

The waveform of the alternating current (the alternating current voltage) is not limited to the rectangular shape, and may be, for example, wavelike.

When the cycle of the alternating current (the alternating current voltage) is T1 and the period of the section 45 of one rectangular wave is T2, a ratio T2/T1 (a duty ratio) of the cycle T1 and the period T2 is preferably equal to or higher than 10% and equal to or lower than 90%, and more preferably equal to or higher than 20% and equal to or lower than 80%, and even more preferably 50%.

The magnitude of the direct current (the direct current voltage) is constant in the embodiment, but is not limited thereto, and may be changed with the passage of time.

As described above, according to the light source device 1, the blackening of the discharge lamp 500 is suppressed, and it is possible to achieve long durability. The protrusions 618 and 718 are formed on the electrodes 610 and 710, it is possible to suppress the inter-electrode distance from spreading, and it is possible to efficiently drive the discharge lamp 500.

The light source device and the method of driving the discharge lamp of the invention have been described above on the basis of the shown embodiment, but the invention is not limited thereto, and the configurations of the units may be replaced by arbitrary configurations having the same function. Other arbitrary configurations may be added to the invention.

In the invention, a plurality of direct current supply sections (the third sections) 43 may be provided in one alternating current stop section (the second period) 42, and a plurality of direct current stop sections (the fourth periods) 44 may be provided.

In the invention, any one, any two, and all of between the alternating current supply section (the first period) 41 and the direction current supply section (the third period) 43, between the direct current supply section (the third period) 43 and the direction current stop section (the fourth period) 44, and between the direct current stop section (the fourth period) 44 and the alternating current supply section (the first period) 41, may be provided with, for example, a section of supplying the other direct current (the direct current voltage), a section of supplying the other alternating current (the alternating current voltage), and a section of not supplying the direct current (the direct current voltage) and the alternating current (the alternating current voltage).

Projector

Figure 5:
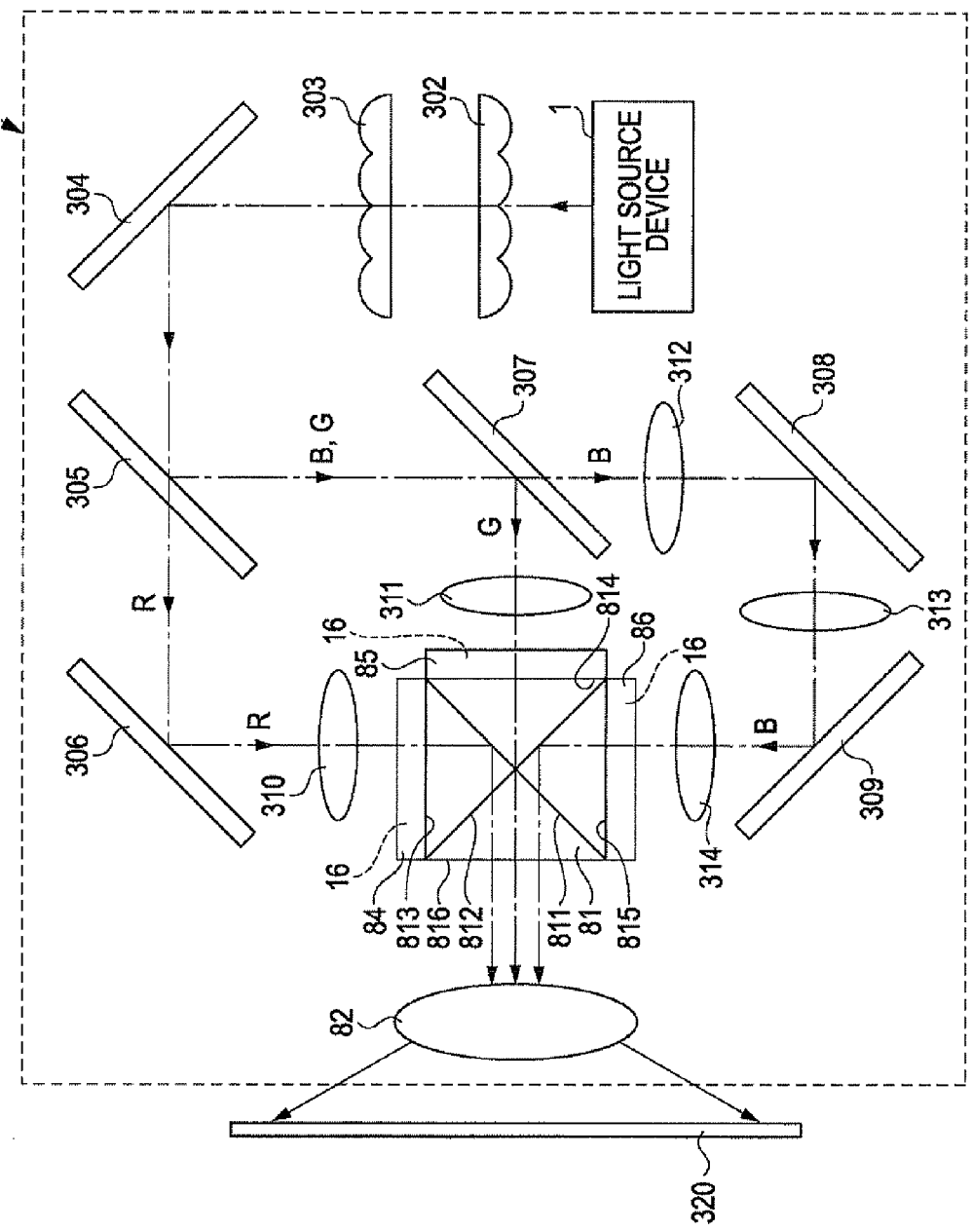
FIG. 5 is a schematic diagram illustrating a projector according to an embodiment of the invention.

FIG. 5 is a diagram schematically illustrating a projector according to the embodiment of the invention.

As shown in FIG. 5, a projector 300 of the embodiment includes the light source device 1 described above, an illumination optical system that has integrator lenses 302 and 303, a color separation optical system (a light guide optical system), a liquid crystal light valve 84 corresponding to red (for red), a liquid crystal light valve 85 corresponding to green (for green), a liquid crystal light valve 86 corresponding to blue (for blue), a dichroic prism (a color synthesis optical system) 81 that is provided with a dichroic mirror face 811 reflecting only red light and a dichroic mirror face 812 reflecting only blue light, and a projection lens (a projection optical system) 82.

The color separation optical system includes mirrors 304, 306, and 309, a dichroic mirror 305 that reflects blue light and green light (allows only red light to pass), a dichroic mirror 307 that reflects only green light, a dichroic mirror 308 that reflects only blue light, and collective lenses 310, 311, 312, 313, and 314.

The liquid crystal light valve 85 includes a liquid crystal panel 16, a first polarization plate (not shown) bonded to an incidence face side of the liquid crystal panel 16, and a second polarization plate (not shown) bonded to an output face side of the liquid crystal panel 16. The liquid crystal light valves 84 and 86 have the same configuration as that of the liquid crystal light valve 85. Each of the liquid crystal panels 16 of the liquid crystal light values 84, 85, and 86 are connected to a driving circuit (not shown).

In the projector 300, a main portion of a modulation device that modulates the light output from the light source device 1 on the basis of image information is configured by the liquid crystal light valves 84, 85, and 86 and the driving circuits, and a main portion of a projection device that projects the light modulated by the modulation device is configured by the projection lens 82.

Next, an operation of the projector 300 will be described.

First, the white light (white light flux) output from the light source device 1 passes through the integrator lenses 302 and 303. The light intensity (brightness distribution) of the white light is made uniform by the integrator lenses 302 and 303.

The white light passing through the integrator lenses 302 and 303 is reflected by the mirror 304 to the left side in FIG. 5, the blue light (B) and the green light (G) of the reflection light are reflected to the lower side in FIG. 5 by the dichroic mirror 305, and the red light (R) passes through the dichroic mirror 305.

The red light passing through the dichroic mirror 305 is reflected to the lower side in FIG. 5 by the mirror 306, and the reflection light is shaped by the collective lens 310, and is input to the red liquid crystal light valve 84.

The green light between the blue light and the green light reflected by the dichroic mirror 305 is reflected to the left side in FIG. 5 by the dichroic mirror 307, and the blue light passes through the dichroic mirror 307.

The green light reflected by the dichroic mirror 307 is shaped by the collective lens 311, and is input to the green liquid crystal light valve 85.

The blue light passing through the dichroic mirror 307 is reflected to the left side in FIG. 5 by the dichroic mirror 308, and the reflected light is reflected to the upper side in FIG. 5 by the mirror 309. The blue light is shaped by the collective lenses 312, 313, and 314, and is input to the blue liquid crystal light valve 86.

As described above, the white light output from the light source device 1 is chromatically separated into three primary colors of red, green, and blue by the color separation optical system, and the light is led and input to the corresponding liquid crystal light values 84, 85, and 86.

In this case, pixels of the liquid crystal panel 16 of the liquid crystal light valve 84 are subjected to switching control (on/off) by a driving circuit operating on the basis of a red image signal, pixels of the liquid crystal panel 16 of the liquid crystal light valve 85 are subjected to switching control by a driving circuit operating on the basis of a green image signal, and pixels of the liquid crystal panel 16 of the liquid crystal light valve 86 are subjected to switching control (on/off) by a driving circuit operating on the basis of a blue image signal.

Accordingly, the red light, the green light, and the blue light are modulated by the liquid crystal light valves 84, 85, and 86, to form a red image, a green image, and a blue image respectively.

The red image formed by the liquid crystal light valve 84, that is, the red light from the liquid crystal light valve 84 is inputted from the incidence face 813 to the dichroic prism 81, is reflected to the left side in FIG. 5 by the dichroic mirror face 811, passed through the dichroic mirror face 812, and is outputted from the output face 816.

The green image formed by the liquid crystal light valve 85, that is, the green light from the liquid crystal light valve 85 is inputted from the incidence face 814 to the dichroic prism 81, passed through the dichroic mirror faces 811 and 812, and is outputted from the output face 816.

The blue image formed by the liquid crystal light valve 86, that is, the blue light from the liquid crystal light value 86 is inputted from the incidence face 815 to the dichroic prism 81, is reflected to the left side in FIG. 5 by the dichroic mirror face 812, passed through the dichroic mirror face 811, and is outputted from the output face 816.

As described above, the color light from the liquid crystal valves 84, 85, and 86, that is, the images formed by the liquid crystal light valves 84, 85, and 86 are synthesized by the dichroic prism 81, to thereby form a color image. The image is projected (enlarged projection) onto a screen 320 provided at a predetermined position by the projection lens 82.

As described above, according to the projector 300, since the light source device 1 is provided, it is possible to reduce power consumption, and it is possible to display a stable and satisfactory image.

Next, specific examples of the invention and comparative examples will be described.

EXAMPLE 1

As shown in FIG. 1 and FIG. 4, a light source device with the following configuration was produced in which the alternating current supply section of supplying the alternating current and the alternating current stop section of stopping the supplying of the alternating current are alternately repeated as described above, and the direct current supply section of supplying the constant direct current and the direct current stop section of stopping the supplying of the direct current are provided in this order in the alternating current stop section. The polarities of the direct currents in two direct current supply sections adjacent to each other were set to be different from each other.
Constituent Material of Discharge Lamp Body 510: Quartz Glass
Enclosed Material in Discharge Lamp Body 510: Argon, Mercury, Methyl Bromine
Atmosphere at Turning-on in Discharge Lamp Body 510: 200 atm
Constituent Material of Electrodes 610 and 710: Tungsten
Inter-Electrode Distance: 1.1 mm
Rated Power: 200 W
Cycle A of Driving Current (Driving Voltage): 4 ms
Frequency of Alternating Current (Alternating Current Voltage): 5 kHz
Duty Ratio (T2/T1) of Alternating Current (Alternating Current Voltage): 50%
Waveform of Alternating Current (Alternating Current Voltage): Rectangular Period (Length) B of Alternating Current Supply Section (First Period): 1.8 ms
Period (Length) C of Direct Current Supply Section (Third Period): 0.18 ms
Period (Length) D of Direct Current Stop Section (Fourth Period): 0.02 ms
Average Value a of Driving Current: 2.9 A
Average Value b of Amplitude of Alternating Current: 2.722 A
Average Value c of Absolute Value of Direct Current: 4.5 A
Relationship between b and c: b<c<2b

COMPARATIVE EXAMPLE 1

In Comparative Example 1, the same light source device as Example 1 was produced except that the alternating current (the alternating current voltage) used as the driving current (the driving voltage) has a frequency of 150 Hz, a duty ratio of 50%, and the waveform is rectangular.

COMPARATIVE EXAMPLE 2

In Comparative Example 2, the same light source device as Example 1 was produced except that the alternating current (the alternating current voltage) used as the driving current (the driving voltage) has a frequency of 5 kHz, a duty ratio of 50%, and the waveform is rectangular.

COMPARATIVE EXAMPLE 3

In Comparative Example 3, the same light source device as Example 1 was produce except that the conditions of the driving current were changed as follows to satisfy the relationship of "c<b".
Average Value a of Driving Current: 2.9 A
Average Value b of Amplitude of Alternating Current: 3.0 A
Average Value c of Absolute Value of Direct Current: 2.0 A

COMPARATIVE EXAMPLE 4

In Comparative Example 4, the same light source device as Example 1 was produce except that the conditions of the driving current were changed as follows to satisfy the relationship of "2b<c".
Average Value a of Driving Current: 2.9 A
Average Value b of Amplitude of Alternating Current: 3.0 A
Average Value c of Absolute Value of Direct Current: 6.5 A
Assessment As for Example 1 and Comparative Examples 1 to 4, assessments were performed as follows. The result is as shown in Table.

In the assessment of (protrusion (inter-electrode distance)), the discharge lamp was turned on, and the change of inter-electrode distance of a pair of electrodes was observed for 500 hours from the start of the turning-on.

In the assessment standard, as for the inter-electrode distance at the time of starting the turning-on, a case of no change in the inter-electrode distance was marked as "O", a case of the change of the inter-electrode distance within 10% was marked as "Δ", and a case of the change of the inter-electrode distance over 10% was marked as "x".

In the assessment of (blackening resistance), the discharge lamp was turned on, the power was turned off after 500 hours from the start of the turning-on, and a red heat state was observed.

In the assessment standard, a case where no red heat was marked as "O", and a case where red heat was marked as "x".

TABLE

|  | Protrusion | Blackening |
|---|---|---|
| Example 1 | ○ | ○ |
| Comparative Example 1 | Δ | x |
| Comparative Example 2 | x | ○ |
| Comparative Example 3 | Δ | x |
| Comparative Example 4 | Δ | x |

As clarified from Table, in Example 1, the protrusions 618 and 718 were reliably formed at the front end portions of the electrodes 610 and 710, there was no change in the inter-electrode distance, the blackening did not occur, and it was possible to obtain a satisfactory result.

Meanwhile, in Comparative Examples 1 to 4, it was difficult to obtain a satisfactory result. Specifically, in Comparative Example 1, the discharge lamp is driven at the frequency of 150 Hz lower than 1 kHz, and thus the protrusions 618 and 718 are formed at the front end portions of the electrodes 610 and 710. Therefore, the assessment of the inter-electrode distance was marked as "Δ", but was marked as "x" since the blackening was recognized in the discharge lamp body.

In Comparative Example 2, the discharge lamp is driven at the frequency of 5 kHz higher than 1 kHz, thus the blackening of the discharge lamp body was not recognized, and the assessment thereof was marked as "○". Meanwhile, the melting of the electrodes 610 and 710 proceeded and the inter-electrode distance was broadened equal to or more than 10% as with respect to the initial period, and thus the assessment thereof was marked as "x".

In Comparative Example 3, the average value b (3.0 A) of the amplitude of the alternating current is larger than the absolute value c (2.0 A) of the amplitude of the direct current, and thus the protrusions 618 and 718 were not stably formed at the front end portions of the electrodes 610 and 710. Therefore, the assessment of the inter-electrode distance was marked as "Δ". The blackening of the discharge lamp body was recognized, and thus the assessment thereof was marked as "x".

In Comparative Example 4, the absolute value c (6.5 A) of the amplitude of the direct current is larger than twice the average value b (3.0 A) of the amplitude of the alternating current, and thus the protrusions 618 and 718 were not stably formed at the front end portions of the electrodes 610 and 710. Therefore, the assessment of the inter-electrode distance was marked as "Δ". The blackening of the discharge lamp body was recognized, and thus the assessment thereof was marked as "x".

The entire disclosure of Japanese Patent Application No. 2011-180327, filed Aug. 22, 2011 and 2012-140544, filed Jun. 22, 2012 are expressly incorporated by reference herein.

What is claimed is:

1. A light source device comprising:
a discharge lamp that has a first electrode and a second electrode arranged to be opposed to each other in a hollow portion in which a discharge medium is enclosed; and
a driving device that supplies a driving voltage to the first electrode and the second electrode,
wherein the driving voltage is applied to the discharge medium through the first electrode and the second electrode such that the discharge medium emits light,
wherein in a first period, the driving device periodically changes relative potential of the first electrode with respect to the second electrode,
wherein in a second period, the driving device does not periodically change the relative potential of the first electrode with respect to the second electrode,
wherein the second period includes a third period of keeping the relative potential of the first electrode with respect to the second electrode to constant potential, and a fourth period of stopping the applying of the driving voltage to the first electrode and the second electrode, and
wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of b<c is satisfied, and
wherein a frequency of the relative potential of the first electrode with respect to the second electrode in the first period is higher than 1 kHz and equal to or lower than 10 GHz.

2. The light source device according to claim 1, wherein polarities in the first electrode with respect to the second electrode in two of the third periods adjacent in time series to each other are different from each other.

3. The light source device according to claim 1, wherein the driving device repeats the first period and the second period, and
wherein the third period is provided just after the first period.

4. The light source device according to claim 1, wherein the driving device repeats the first period and the second period, and
wherein the first period is provided just after the fourth period.

5. The light source device according to claim 1, wherein a length of the first period is equal to or longer than 0.5 ms and equal to or shorter than 50 ms.

6. The light source device according to claim 1, wherein a length of the third period is equal to or more than 1% and equal to or less than 50% of the length of the first period.

7. The light source device according to claim 1, wherein a length of the fourth period is equal to or longer than 1 μs and equal to or shorter than 5 ms.

8. The light source device according to claim 1, wherein in two of the first periods adjacent in time series to each other, a length of a start of a first of the first periods to an end of the second period just after a second of the first periods is equal to or longer than 1 ms and equal to or shorter than 100 ms.

9. The light source device according to claim 1, wherein a waveform of the driving voltage in the first period is rectangular.

10. The light source device according to claim 1, wherein the fourth period is provided just after the third period in the second period.

11. A light source device comprising:
a discharge lamp that has a first electrode and a second electrode arranged to be opposed to each other in a hollow portion in which a discharge medium is enclosed; and
a driving device that supplies a driving voltage to the first electrode and the second electrode,
wherein the driving voltage is applied to the discharge medium through the first electrode and the second electrode such that the discharge medium emits light, wherein in a first period, the driving device periodically changes relative potential of the first electrode with respect to the second electrode,
wherein in a second period, the driving device does not periodically change the relative potential of the first electrode with respect to the second electrode,
wherein the second period includes a third period of keeping the relative potential of the first electrode with respect to the second electrode to constant potential, and a fourth period of stopping the applying of the driving voltage to the first electrode and the second electrode,
wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of c<2b is satisfied, and
wherein a frequency of the relative potential of the first electrode with respect to the second electrode in the first period is higher than 1kHz and equal to or lower than 10 GHz.

12. A light source device comprising:
a discharge lamp that has a first electrode and a second electrode arranged to be opposed to each other in a hollow portion in which a discharge medium is enclosed; and
a driving device that supplies a driving voltage to the first electrode and the second electrode,
wherein the driving voltage is applied to the discharge medium through the first electrode and the second electrode such that the discharge medium emits light,
wherein in a first period, the driving device periodically changes relative potential of the first electrode with respect to the second electrode,
wherein in a second period, the driving device does not periodically change the relative potential of the first electrode with respect to the second electrode,
wherein the second period includes a third period of keeping the relative potential of the first electrode with respect to the second electrode to constant potential, and a fourth period of stopping the applying of the driving voltage to the first electrode and the second electrode,
wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of b<c<2b is satisfied, and
wherein a frequency of the relative potential of the first electrode with respect to the second electrode in the first period is higher than 1kHz and equal to or lower than 10 GHz.

13. A method of driving a discharge lamp which has a first electrode and a second electrode arranged to be opposed to each other in a hollow portion in which a discharge medium is enclosed,
wherein a driving voltage is applied to the discharge medium through the first electrode and the second electrode such that the discharge medium emits light,
wherein when a first period of periodically changing relative potential of the first electrode with respect to the second electrode, and a second period including a third period of not periodically changing the relative potential of the first electrode with respect to the second electrode and keeping the relative potential of the first electrode with respect to the second electrode to constant potential, and a fourth period of stopping applying the driving voltage to the first electrode and the second electrode are provided, when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of b<c<2b is satisfied, and
wherein a frequency of the relative potential of the first electrode with respect to the second electrode in the first period is higher than 1 kHz and equal to or lower than 10 GHz.

14. A projector comprising:
a light source device;
a modulation device that modulates light output from the light source device on basis of image information; and
a projection device that projects the light modulated by the modulation device,
wherein the light source device includes a discharge lamp that has a first electrode and a second electrode arranged to be opposed to each other in a hollow portion in which a discharge medium is enclosed, and a driving device that supplies a driving voltage to the first electrode and the second electrode,
wherein the driving voltage is applied to the discharge medium through the first electrode and the second electrode such that the discharge medium emits light,
wherein in a first period, the driving device periodically changes relative potential of the first electrode with respect to the second electrode,
wherein in a second period, the driving device does not periodically change the relative potential of the first electrode with respect to the second electrode,
wherein the second period includes a third period of keeping the relative potential of the first electrode with respect to the second electrode to constant potential, and a fourth period of stopping the applying of the driving voltage to the first electrode and the second electrode,
wherein when an absolute value of a difference between an intermediate value between a maximum value and a minimum value of the potential of the first electrode and the maximum value in the first period is b and an absolute value of a difference between a maximum value of the potential of the first electrode in the second period and the intermediate value in the first period is c, a relationship of b<c<2b is satisfied, and
wherein a frequency of the relative potential of the first electrode with respect to the second electrode in the first period is higher than 1 kHz and equal to or lower than 10 GHz.

\* \* \* \* \*